United States Patent
Ju et al.

(10) Patent No.: US 12,188,760 B2
(45) Date of Patent: Jan. 7, 2025

(54) SPECIAL OPTICAL FIBER FOR MEASURING 3D CURVED SHAPE, MANUFACTURING METHOD THEREOF, AND SYSTEM FOR MEASURING 3D CURVED SHAPE BY USING SPECIAL OPTICAL FIBER

(71) Applicants: OPTONICS CO., LTD, Gwangju (KR); Seong Min Ju, Gwangju (KR)

(72) Inventors: Seong Min Ju, Gwangju (KR); Young Woo Lee, Gwangju (KR)

(73) Assignees: OPTONICS CO., LTD, Gwangju (KR); Seong Min Ju, Gwangju (KR)

(*) Notice: Subject to any disclaimer, the term of this patent is extended or adjusted under 35 U.S.C. 154(b) by 374 days.

(21) Appl. No.: 17/772,875

(22) PCT Filed: Oct. 30, 2020

(86) PCT No.: PCT/KR2020/015072
§ 371 (c)(1),
(2) Date: Apr. 28, 2022

(87) PCT Pub. No.: WO2021/086129
PCT Pub. Date: May 6, 2021

(65) Prior Publication Data
US 2022/0390224 A1 Dec. 8, 2022

(30) Foreign Application Priority Data
Oct. 31, 2019 (KR) .................. 10-2019-0137757
Oct. 31, 2019 (KR) .................. 10-2019-0137758

(51) Int. Cl.
*G01B 11/24* (2006.01)
*C03B 37/01* (2006.01)
(Continued)

(52) U.S. Cl.
CPC .............. *G01B 11/24* (2013.01); *C03B 37/01* (2013.01); *C03C 25/106* (2013.01);
(Continued)

(58) Field of Classification Search
CPC . C03B 37/01; C03B 2203/06; C03B 2203/22; G01B 11/24; C03C 25/106; G02B 6/03627
See application file for complete search history.

(56) References Cited

U.S. PATENT DOCUMENTS

| 6,389,187 B1 | 5/2002 | Greenaway et al. |
| 9,285,246 B2 | 3/2016 | Prisco et al. |
(Continued)

FOREIGN PATENT DOCUMENTS

| JP | H08511343 | 11/1996 |
| JP | 2007310135 | 11/2007 |
(Continued)

OTHER PUBLICATIONS

International Search Report—PCT/KR2020/015072 dated Jan. 29, 2021.

*Primary Examiner* — Tina M Wong
(74) *Attorney, Agent, or Firm* — CANTOR COLBURN LLP

(57) ABSTRACT

Provided is a special optical fiber for measuring a 3D curved shape, and a system for measuring the 3D curved shape by using a special optical fiber. The special optical fiber comprises: an optical fiber core for transmitting an optical signal; an inner cladding covering the optical fiber core; and an outer cladding covering the inner cladding. In particular, the refractive index (n1) of the optical fiber core, the refractive index (n2) of the inner cladding, and the refractive index (n3) of the outer cladding are set in a relationship of n1≥n3>n2. The inner cladding covering the optical fiber core
(Continued)

has a cut portion in the longitudinal direction. The optical fiber core is exposed through the cut portion. In addition, the cut portion is filled with a material having the same refractive index as the optical fiber core or the outer cladding.

14 Claims, 7 Drawing Sheets

(51) Int. Cl.
    *C03C 25/106*     (2018.01)
    *G02B 6/036*     (2006.01)

(52) U.S. Cl.
    CPC ...... *G02B 6/03627* (2013.01); *C03B 2203/06* (2013.01); *C03B 2203/22* (2013.01)

(56) References Cited

U.S. PATENT DOCUMENTS

| | | |
|---|---|---|
| 10,524,701 B2 | 1/2020 | Kim et al. |
| 2009/0324161 A1 | 12/2009 | Prisco |
| 2017/0095143 A1* | 4/2017 | Sato ........................ G01B 11/18 |
| 2019/0029763 A1* | 1/2019 | Sato ................... A61B 1/00004 |

FOREIGN PATENT DOCUMENTS

| | | |
|---|---|---|
| JP | 2011257310 | 12/2011 |
| KR | 20120023992 | 3/2012 |
| WO | 1994029671 | 12/1994 |
| WO | 2013114376 | 8/2013 |

\* cited by examiner

SPECIAL OPTICAL FIBER FOR MEASURING 3D CURVED SHAPE, MANUFACTURING METHOD THEREOF, AND SYSTEM FOR MEASURING 3D CURVED SHAPE BY USING SPECIAL OPTICAL FIBER

TECHNICAL FIELD

The present invention relates to a special optical fiber for measuring a three-dimensional curved shape and a method for manufacturing thereof. More particularly, the present invention relates to a special optical fiber that manifests a specific optical effect due to being curved into various directions in three-dimensional space, and a method for manufacturing the special optical fiber.

Further, the present invention relates to a system for measuring an arbitrary three-dimensional curved shape using a special optical fiber that manifests a specific optical effect due to being curved into different directions in a three-dimensional space.

BACKGROUND ART

Recently, optical fiber sensors have been used in various fields utilizing the Internet of Things (IoT). That is, changes in the surrounding environment that can be detected using the optical fiber sensors can be transmitted to and processed by the artificial intelligence system through high-speed internet communication.

The changes in the surrounding environment that can be measured by the optical fiber sensors may include changes of the temperature, the pressure, the electric field, the magnetic field, the rotation, the concentration of a chemical substance, the amount of physical movement, and the like.

The optical fiber sensors function based on an optical signal. Therefore, they have a very fast response characteristic compared to the conventional electromagnetic-based sensors. In addition, since the optical fiber sensors do not include electrical electrodes, there is no noise due to electromagnetic waves originating from the surrounding environment, and there is no risk of electric leakage or electric shock. In addition, the optical fiber, which is a sensor probe, has light weight, and thus the optical fiber sensor is advantageous for commercialization.

Accordingly, the optical fiber sensors may be used in an environment in which it is difficult to operate the prior electromagnetic-based sensors, for example, an environment with severe electromagnetic interference, or a high temperature/high pressure/humid environment. Accordingly, the optical fiber sensors are used in various fields such as a communication field, a medical field, and an industrial field.

Meanwhile, the application of optical fibers as a sensor for measuring a three-dimensional curved shape has also been developing. A technology for measuring a three-dimensional curved shape using optical fibers has very high utility in the medical field or industrial field, and has been implemented in various products. In particular, the optical fiber-based three-dimensional curved shape measuring sensors can image the deformation at all points of the entire optical fiber in real time, and thus are suitable for measuring the shape and deformation of invisible portions of a structure.

Meanwhile, as a prior optical fiber-based curved shape measuring sensor, there is a sensor which uses a multi-core optical fiber in which a plurality of fibers are disposed. FIG. 1 shows an example of a curved shape measuring sensor using a prior FBG-based multi-core optical fiber. Here, in each of the optical fibers used in the prior curved shape measuring sensor, a Fiber Bragg Grating (FBG) or a Long-Period Grating (LPG)) is formed in the core region to generate optical loss due to the bending of the optical fiber.

However, the prior curved shape measuring sensor using the FBG can only determine the point at which bending occurs, but cannot measure the direction towards which the optical fiber is bent in three-dimensional space. Therefore, in the prior art, the respective channels are configured by using the corresponding respective optical fibers, and the bending direction is measured by detecting the channel in which bending has occurred.

Moreover, in order to form the optical fiber having the FBG, there is a problem in that the post-processing and the secondary processing have to be added to an optical fiber fabricated completely.

Further, the prior optical fiber has a disadvantage in that the distance resolution is low since a bent shape is measured based on the optical loss caused by the bending of the portion where the FBG is formed.

In addition, the optical fiber sensor of the prior FBG technology is based on optical loss and wavelength shifting from the optical fiber grating, wherein the wavelength shift is sensitively changed according to the change of external temperature. Therefore, there is a problem in that it is necessary to apply a compensation function according to the temperature during the measurement.

(Patent Document 1) JP Patent No. 2015-510142
(Patent Document 2) JP Patent No. H08-511343
(Patent Document 3) KR Patent Application Publication No. 10-2017-0138768

DISCLOSURE

Technical Problem

The present invention is intended to solve the above problems. That is, one object of the present invention is to provide a novel three-dimensional curved shape measuring sensor that can image a three-dimensional curved shape while using an optical fiber that has been fabricated by a method such as a drawing, that is, an optical fiber without the FBG, as a sensor probe. Another object of the present invention is to provide a special optical fiber used in the novel three-dimensional curved shape measuring sensor. The other object of the present invention is to provide a method for manufacturing a special optical fiber.

In addition, the present invention is to provide a system for measuring a three-dimensional curved shape including the special optical fiber.

In accordance with one embodiment, a special optical fiber for measuring a three-dimensional curved shape comprises an optical fiber core for transmitting an optical signal, an inner cladding covering the optical fiber core, and an outer cladding covering the inner cladding, wherein the refractive index n1 of the optical fiber core, the refractive index n2 of the inner cladding, and the refractive index n3 of the outer cladding are set in a relationship of n1≥n3>n2, the inner cladding covering the optical fiber core has a longitudinal cut-open portion which exposes a portion of the optical fiber core therethrough, and the cut-open portion is filled with a material having the same refractive index as that of the optical fiber core or the outer cladding.

In accordance with a further embodiment, the special optical fiber further comprises a guide core disposed inside the outer cladding in parallel with the optical fiber core, wherein the guide core has a color or a refractive index different from that of the outer cladding.

In accordance with a further embodiment of the special optical fiber, a plurality of the inner claddings covering the optical fiber core are disposed inside the outer cladding, the inner claddings are disposed radially at intervals of an equal azimuth angle around the center of the cross-section of the outer cladding, and the cut-open portions of the inner claddings are disposed to face away from the center.

In accordance with a further embodiment, the special optical fiber further comprises a guide core disposed inside the outer cladding parallel to any one of the optical fiber cores, wherein the guide core has a color or a refractive index different from that of the outer cladding.

In accordance with a further embodiment of the special optical fiber, the thickness of the inner cladding is set to twice the diameter of the optical fiber core.

In accordance with another embodiment, a method of manufacturing a special optical fiber for measuring a three-dimensional curved shape is provided, wherein the optical fiber comprises an optical fiber core transmitting an optical signal, an inner cladding covering the optical fiber core, and an outer cladding covering the inner cladding. The method may comprise: preparing the outer cladding; forming an insertion hole in the outer cladding into which the inner cladding is to be inserted; preparing the optical fiber core; preparing the inner cladding in the form of a tube having an inner space into which the optical fiber core is to be inserted, wherein the inner cladding has a cut-open portion formed in longitudinal direction of the inner cladding; inserting the optical fiber core into the inner space of the inner cladding; filling the cut-open portion of the inner cladding with a material having the same refractive index as that of the optical fiber core or the outer cladding; and inserting the inner cladding into which the optical fiber core has been inserted into the insertion hole of the outer cladding.

In accordance with another embodiment, a method of manufacturing a special optical fiber for measuring a three-dimensional curved shape is provided, wherein the optical fiber comprises an optical fiber core transmitting an optical signal, an inner cladding covering the optical fiber core, and an outer cladding covering the inner cladding, and wherein the refractive index (n1) of the optical fiber core, the refractive index (n2) of the inner cladding, and the refractive index (n3) of the outer cladding are set in the relationship of $n1 \geq n3 > n2$. The method may comprise: preparing the outer cladding; forming an insertion hole in the outer cladding into which the inner cladding is to be inserted; preparing the optical fiber core; coating the optical fiber core in a C-shape using a rod-in-tube process of partially coating the optical fiber core with a material for constituting the inner cladding; filling a cut-open portion in the C-shape of the inner cladding with a material having the same refractive index as that of the optical fiber core or the outer cladding; and inserting the optical fiber core coated with the inner cladding into the insertion hole of the outer cladding.

In accordance with another embodiment, a method of manufacturing a special optical fiber for measuring a three-dimensional curved shape is provided, wherein the optical fiber comprises an optical fiber core transmitting an optical signal, an inner cladding covering the optical fiber core, and an outer cladding covering the inner cladding, and wherein the refractive index (n1) of the optical fiber core, the refractive index (n2) of the inner cladding, and the refractive index (n3) of the outer cladding are set in the relationship of $n1 \geq n3 > n2$. The method may comprise: preparing the outer cladding; forming an insertion hole in the outer cladding into which the inner cladding is to be inserted; preparing the optical fiber core; coating the entire outer surface of the optical fiber core with a material for constituting the inner cladding; exposing a portion of the optical fiber core by cutting or etching a portion of the inner cladding along a longitudinal direction of the optical fiber core; and inserting the optical fiber core covered with the inner cladding into the insertion hole of the outer cladding.

In accordance with a further embodiment of the method, the insertion holes formed in the outer cladding are radially arranged at equal azimuth angle intervals around the center of the cross-section of the outer cladding, and are formed parallel to each other along the longitudinal direction of the outer cladding, and the inner claddings are arranged such that the cut-open portions are opened towards the outer peripheral side of the cross-section of the outer cladding.

In accordance with another embodiment, a system for measuring a three-dimensional curved shape using a special optical fiber is provided, wherein the system comprises: a LD for outputting an optical signal having a predetermined peak and a predetermined width to an input side of the optical fiber core; a PD1 for measuring a power of the optical signal output from the LD and input to the optical fiber core; a TDC part for detecting a peak of a reflected signal formed by the optical signal being scattered at a bending location of the optical fiber core and being returned to the input side of the optical fiber core; a PD2 for measuring a power of the reflected signal; and an FPGA for controlling operations of the LD, the PD1, the TDC part, and the PD2, and calculating the bending location of the optical fiber core and a curvature of the bending location, based on the peak of the optical signal output from the LD, the power of the optical signal measured by the PD1, the peak of the reflected signal detected from the TDC part, and the power of the reflected signal measured by the PD2.

In accordance with a further embodiment of the system, wherein the optical fiber core further comprises: an inner cladding covering the optical fiber core, and an outer cladding covering the inner cladding; and wherein the refractive index n1 of the optical fiber core, the refractive index n2 of the inner cladding, and the refractive index n3 of the outer cladding are set in a relationship of $n1 \geq n3 > n2$, the inner cladding covering the optical fiber core has a cut-open portion that is cut in the longitudinal direction to expose a portion of the optical fiber core, and the cut-open portion is filled with a material having the same refractive index as that of the optical fiber core or the outer cladding.

In accordance with a further embodiment of the system, a plurality of the inner claddings each covering the optical fiber core is disposed inside the outer cladding and each inner claddings configures each channel, the inner claddings are disposed radially at equal azimuth angle intervals around a center of a cross-section of said outer cladding; the respective inner claddings are arranged such that said cut-open portions faces away from the center of said outer cladding; the LD, the PD1, the TDC part, the PD2 and the FPGA constitute one bending measurement device, the respective bending measurement devices are arranged to correspond to each of the optical fiber cores, and the system further comprising an integrated data processor for reproducing the three-dimensional curved shape by integrating bending locations and curvatures of the bending locations output from the bending measurement devices for the respective channels.

In accordance with a further embodiment of the system, the FPGA is configured to: output a first pulse signal having a first width from the LD; detect a reflected signal of the first pulse signal by the TDC part, set a sampling point including a time point at which the reflected signal appears after the first pulse signal is output, based on the reflected signal; output a second pulse signal having a second width from the LD; detect a peak of a reflected signal of the second pulse signal by the TDC part at the sampling point and measuring a power of the reflected signal of the second pulse signal by the PD2; and calculate a bending location of the optical fiber core based on the detected peak, and calculate a curvature of the bending location based on the measured power.

In accordance with a further embodiment of the system, the width of the first pulse is smaller than a width of the second pulse.

According to the present invention including the above configurations, it is possible to provide a special optical fiber for measuring a three-dimensional curved shape. The special optical fiber has a structure in which core structures formed by assembling optical fiber cores and inner claddings are arranged at equal azimuth angle intervals within the outer cladding. Furthermore, the optical fiber core can be manufactured by a method such as drawing (no FBG is formed), and the inner cladding has a cut-open portion.

In addition, according to the present invention, it is possible to implement a three-dimensional curved shape measurement system using a special optical fiber in which the FBG is not formed.

MODE FOR INVENTION

Hereinafter, the present invention will be described in more detail with reference to the accompanying drawings. The terms or words used in the present specification and claims should not be construed as being limited to conventional or dictionary meanings. On the contrary, the terms or words should be interpreted as meanings and concepts consistent with the technical idea of the present invention, based on the principle that the inventor may appropriately define the concept of a term in order to best disclose the invention. In addition, the technical and scientific terms used have the meanings commonly understood by those of ordinary skill in the art to which this invention belongs, unless the meanings are specifically defined.

In the following description and accompanying drawings, descriptions of well-known functions and configurations that may unnecessarily obscure the gist of the present invention will be omitted. The accompanying drawings are provided as examples in order to sufficiently present the spirit of the present invention to those skilled in the art. Accordingly, the present invention is not limited to the drawings presented below and may be embodied in other forms. Also, throughout this specification, like reference numbers refer to like elements. It should be noted that identical components in drawings are denoted by identical reference numbers whenever possible.

Figure 3:
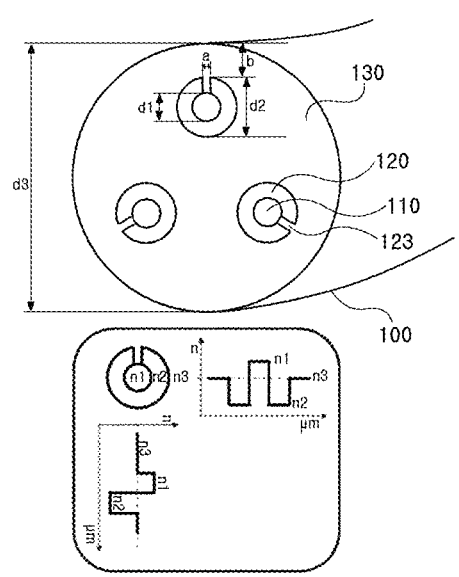
FIG. 3 illustrates the cross-sectional structure and refractive index distribution of the special optical fiber of the three-dimensional curved shape measuring system according to an embodiment of the present invention.

First, with reference to FIG. 3, a cross-sectional structure of a special optical fiber that is used as a sensor probe in a three-dimensional curved shape measuring system according to an embodiment of the present invention will be described. In addition, the refractive index distribution of each component will be described.

A special optical fiber 100 according to the present invention, used to measure the three-dimensional curved shape may include a plurality of core structures. In particular, each core structure disposed in the special optical fiber 100 includes an optical fiber core 110 and an inner cladding 120 covering the optical fiber core. Refractive indices of the optical fiber core 110 and the inner cladding 120 may be set to be different from each other. Specifically, the refractive index n2 of the inner cladding 120 is set to be lower than (or equal to, or higher in special cases) the refractive index n1 of the optical fiber core. In addition, the refractive index n2 is set to be lower than (or equal to, or higher in special cases) the refractive index n3 of an outer cladding 130.

In addition, the inner cladding 120 is configured in a shape cut-open in the longitudinal direction. The cut-open cavity 123 is formed to expose a portion of the optical fiber core 110. The cut-open cavity 123 may be filled with the same material as the optical fiber core 110 or the outer cladding 130. Due to this structure, the special optical fiber 100 manifests a characteristic that the optical loss is made larger with respect to bending in a specific direction. That is, when the cut-open portion 123 is disposed on the outside at bending, a large optical loss occurs through the cut-open portion 123, and thus bending can be detected more sensitively.

Meanwhile, the special optical fiber 100 according to the present invention may include a plurality of core structures. Here, the optical fiber core 110 constituting each core structure is arranged at equal azimuth angle intervals around the center of the cross-section of the special optical fiber 100. In addition, the cut-open portion 123 of the inner cladding 120 covering the optical fiber core 110 is arranged to face away from the center of the cross-section of the special optical fiber 100, i.e., to be opened towards the outer peripheral side of the cross-section of the special optical fiber 100.

In this structure, if the longitudinal direction of the optical fiber is defined as the Z-axis, the Z coordinate of the location where the optical loss occurs can be measured using an Optical Time-Domain Reflectometer (OTDR) and an Optical Frequency Domain Reflectometry (OFDR).

In addition, if the X and Y axes are defined on the cross sectional plane of the optical fiber 100, the X coordinate and Y coordinate associated with the direction of the bending, at the location where the optical loss due to the bending of the optical fiber 100 occurs, can be measured by collecting and analyzing information related to the optical losses at each of optical fiber cores.

In particular, when the special optical fiber 100 according to the present invention is used, each bending direction and curvature can be measured at a plurality of locations along the longitudinal direction of the optical fiber.

In addition, the special optical fiber 100 according to the present invention can ignore the influence of temperature when a three-dimensional shape is measured.

Prior FBG-based optical fibers have also been widely used for measuring temperature. That is, the prior FBG-based optical fiber can be used for measuring temperature because the reflection characteristic for a specific wavelength formed by the FBG changes in response to a physical change such as a change in temperature. This means that when measuring the curvature using an FBG-based optical fiber, it is essential to compensate for the effect of temperature.

However, since the special optical fiber 100 according to the present invention is not based on the FBG, it is hardly affected by temperature and no additional temperature compensation is required.

Further, if an optical fiber for temperature compensation containing boron and fluorine is used as the optical fiber core 110 of the special optical fiber 100 of the present invention, the field of application of the special optical fiber can be further expanded. In addition, when the special optical fiber 100 of the present invention is integrated with a Distributed Temperature Sensor (DTS) based on Raman scattering and Brillouin scattering characteristics, it is possible to measure the temperature distribution along the longitudinal direction of the special optical fiber as well as the three-dimensional shape by using the special optical fiber 100 of the present invention. Therefore, it is possible to implement a multi-purpose sensor that can obtain various information by means of a single probe.

As described above, with reference to FIG. 3, the special optical fiber 100 of the present invention comprises three core structures which are disposed at intervals of the azimuth angle of 120° along the periphery of the cross section.

Each of the core structures is arranged such that the respective cut-open portions 123 face a direction away from the center of the special optical fiber 100. As a result, the special optical fiber 100 is more sensitive to light loss when the cut-open portion 123 is directed to the outside of the bent, so that the bending direction and curvature in the direction in which each optical fiber core is arranged can be precisely and accurately measured. Therefore, by integrating the bending directions and curvatures measured in each of the plurality of optical fiber cores, it is possible to precisely and accurately measure the three-dimensional bending directions and curvatures. The lower part of FIG. 3 shows the refractive index according to the cross-section of the optical fiber.

Figure 4:
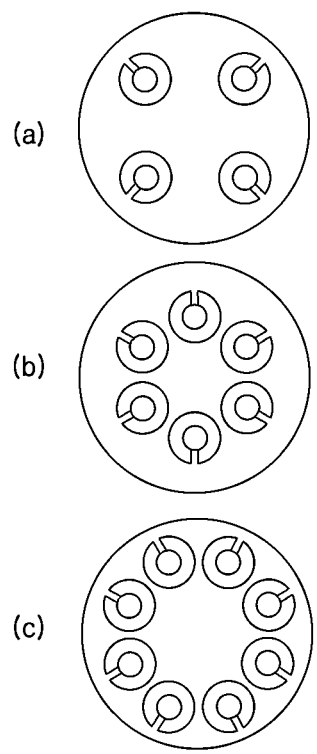
FIG. 4 illustrates cross-sectional structures according to various embodiments of the special optical fiber of the present invention.

Meanwhile, FIG. 4 shows the special optical fiber 100 includes four core structures which are arranged at intervals of the equal azimuth angle of 90° around the center, and six core structures which are arranged at intervals of the equal azimuth angle of 60° around the center, and eight core structures which are arranged at intervals of the equal azimuth angle of 45° around the center. As the number of core structures increases, the special optical fiber becomes more sensitive to bending due to the increased arrangement directions of the core structures, so that it is possible to measure the three-dimensional shape more accurately and in detail.

The optical fiber core 110 is a part through which an optical signal is transmitted.

The inner cladding 120 covers the optical fiber core 110 and totally reflects an optical signal transmitted through the optical fiber core to flow along the inside of the optical fiber core. In particular, the inner cladding 120 is configured in a shape cut-open along the longitudinal direction of the optical fiber core 110, and thus a part of the optical fiber core 110 is exposed through the cut-open portion 123. Preferably, the width of the cut-open portion 123 is constant. The cut-open portion 123 of the inner cladding may be filled with the same material as the optical fiber core 110 or with a material having the same refractive index as that of the optical fiber core 110. Alternatively, the cut-open portion 123 may be filled with the same material as the outer cladding 130 or with a material having the same refractive index as that of the outer cladding 130.

The outer cladding 130 covers the inner cladding 120 and constitutes the outer shape of the special optical fiber 100. The outer cladding 130 may include a plurality of core structures each including the optical fiber core 110 and the inner cladding 120. Referring to FIG. 3, the outer cladding 130 corresponds to a peripheral portion surrounding the optical fiber core 110 and the inner cladding 120. This outer cladding 130 effectively induces optical loss in the inner cladding 120 or cut-open portion 123 in proportion to the radius of curvature when the special optical fiber 100 is bent.

In particular, in the present invention, the refractive index n1 of the optical fiber core 110, the refractive index n2 of the inner cladding 120, and the refractive index n3 of the outer cladding 130 may be set in a relationship of $n1 \geq n3 > n2$.

For example, the actual value of the refractive index of the respective parts of the special optical fiber 100 of the present invention may be set to n1=1.4631, n2=1.4571 and n3=1.4611 for a wavelength of 633 nm. This corresponds to 0.6% of $\Delta n1\text{-}2$ which is the difference between n1 and n2, 0.2% of $\Delta n1\text{-}3$ which is the difference between n1 and n3, and 0.4% of $\Delta n3\text{-}2$ which is the difference between n3 and n2. Since the sensitivity of bending measurement is determined according to the difference in refractive index of the respective parts, when a special optical fiber is applied to a 3D shape sensor, the difference in refractive index of the respective parts must be accurately selected to manufacture the 3D shape sensor. To this end, when the difference in the refractive index between the silica glass and the plastic optical fiber is defined as a reference, the refractive index of the respective parts can be controlled by applying germanium (Ge) or aluminum (Al) to increase the difference in the refractive index than the reference, or by applying boron (B) or fluorine (F) to lower the difference in the refractive index than the reference, Here, if the difference in refractive index between the optical fiber core 110 and the outer cladding 130 is small, the optical fiber 100 responds more sensitively to bending when the cut-open portion 123 faces outward (in this case the optical fiber is bent toward the center). That is, by $\Delta n1\text{-}3$, the sensitivity of the detection of the location of a bending and the accuracy of the measurement of the curvature of the bending may be determined. Meanwhile, as $\Delta n3\text{-}2$ increases, the sensitivity and accuracy of bending measurement may be increased.

In the special optical fiber 100 of the present invention, the diameter d1 of the optical fiber core 110 may be set to 9 to 10 μm, when the diameter d3 of the outer cladding 130 constituting the outermost portion of the special optical fiber is 125 μm. If the inner cladding 120 is too thin, light loss from the optical fiber core 110 may occur for bending in all directions, and thus the accuracy of bending detection may be lowered. Accordingly, the diameter d2 of the inner cladding 120 may be set to about 20 μm, which is approximately twice the diameter of the optical fiber core 110.

Meanwhile, the cut-open portion 123 which is cut along the longitudinal direction of the inner cladding 120 acts as an important factor related to the accuracy of bending detection and greatly affects the accuracy of bending detection. That is, as the width of the cut-open portion 123 reduces, the precision of detecting bending curvature increases. However, if the width of the cut-open portion is too narrow, the light loss will be too small, which reduces the sensitivity of the detection of the bending location in the longitudinal direction. Conversely, if the width of the cut-open portion 123 is too wide, the sensitivity of detecting bending location in the longitudinal direction is enhanced, but the sensitivity of detecting bending curvature is decreased. Therefore, in the present invention, the width of the cut-open portion 123 is set to about 3 μm.

An optical signal is basically transmitted towards a portion with a high refractive index on the basis of the principle of total reflection. Accordingly, if the refractive index of the optical fiber core 110 is higher than that of the inner cladding 120, an optical signal is transmitted along the optical fiber core 110 when there is no bending. At this time, there is no optical loss except for the loss in the optical fiber itself. Meanwhile, when bending occurs in the optical fiber core 110, portions in which tensile and compressive stresses due to bending occur in the inner cladding 120. Due to this change, the refractive index of the inner cladding 120 is changed (the refractive index of the stretched portion increases). Then, the optical signal transmitted through the optical fiber core 110 flows towards the inner cladding 120, and thus the optical loss occurs.

Meanwhile, the distance b between the outer circumferential surface of the outer cladding 130 and the outer circumferential surface of the inner cladding 120 also affects the sensitivity for detecting the bending location in the longitudinal direction (Z axis) of the optical fiber 100. The closer the optical fiber cores are positioned to the outer peripheral surface of the outer cladding 130, that is, the smaller the value (b), the higher the optical loss through the outer cladding 130 due to bending of the special optical fiber 100. That is, since the optical loss increases at the respective locations where bending occurs and the loss of light passing through the special optical fiber 100 becomes large, it is disadvantageous to long-distance sensing. Accordingly, in this case, it is necessary to use a high-power light source. In general, for the three-dimensional shape measurement using an optical fiber, a laser diode (LD) and a photodiode (PD) having excellent optical output power and resolution, and capable of stable power supplying and stable light sensing, may be used. Thereby, the above problem can be substantially solved.

Figure 5:
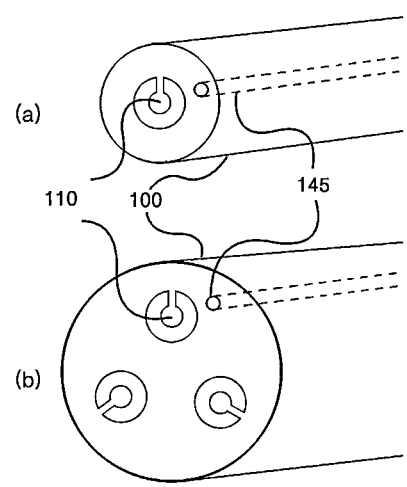
FIG. 5 illustrates a form in which a guide core is added to the special optical fiber of the present invention.

Meanwhile, as an additional embodiment of the special optical fiber described in the present invention, a form in which a guide core is added will be described with reference to FIG. 5. If the special optical fiber is twisted or wrung around the longitudinal direction as the axis of rotation, the curvature measurement will be inaccurate. Therefore, it is necessary for the operator or optical device performing the measurement to check whether the special optical fiber is twisted before performing the curvature measurement.

To this end, the present embodiment discloses a structure in which a guide core is disposed in an optical fiber in parallel with the optical fiber, for example, in the vicinity of a specific one optical fiber core.

In FIG. 5(a), one optical fiber core 110 is covered with an inner cladding on which a cut-open portion is formed, and the shape of the special optical fiber in which an outer cladding is formed is illustrated. Here, it can be seen that the guide core 145 is disposed on one side of the outer cladding. A specific color of light may be incident on the guide core, a material constituting the guide core may be dyed with a specific color, or the refractive index of the guide core may be set to be different from at least the refractive index of the outer cladding. Thereby, the operator can visually identify the guide core or the optical device can detect the guide core by sensing optically, thereby detecting the twist of the special optical fiber and recovering the twist.

FIG. 5(b) illustrates an example of arranging a guide core in a special optical fiber in which a plurality of optical fiber cores are radially disposed around the center. The guide core may be disposed adjacent to any one optical fiber core.

In the special optical fiber according to the present invention having a plurality of optical fiber cores, it is very important that the optical fiber is not twisted. Therefore, by arranging the guide core, it is possible to identify and repair the twist or wring of the special optical fiber.

Meanwhile, in the special optical fiber 100 having the above structure, germanium silica glass and aluminum silica glass can be applied as the optical fiber core 110 and the outer cladding 130. In addition, concentrations of germanium and aluminum may be increased in order to increase their refractive index. In addition, for the inner cladding, glass containing fluorine and boron can be applied to lower the refractive index.

Figure 6:
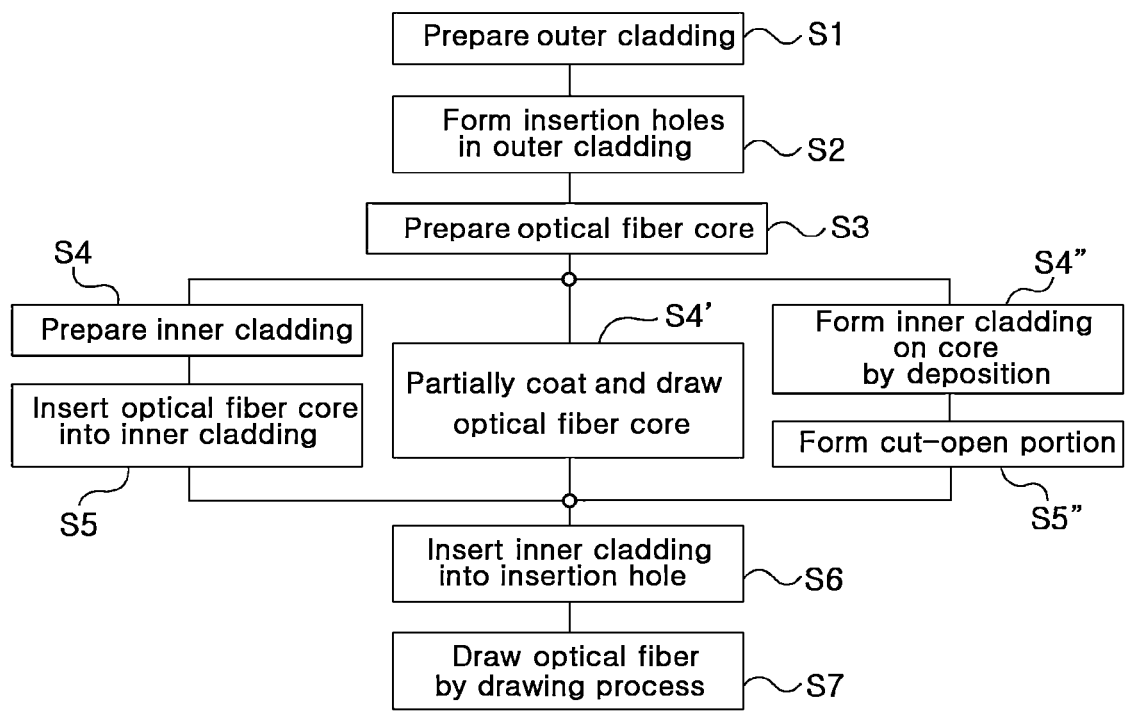
FIG. 6 is a flowchart illustrating a method of manufacturing a special optical fiber according to the present invention.

A method of manufacturing the special optical fiber 100 according to the present invention may refer to the flowchart of FIG. 6.

First, an outer cladding 130, which is the basic shape of the special optical fiber 100, may be prepared (S1). The outer cladding 130 is formed of pure silica glass, a glass material for an optical fiber core for the purpose of increasing the refractive index, and a glass material having a slightly lower refractive index than a glass material for an optical fiber core.

And in the outer cladding 130, insertion holes may be formed in the longitudinal direction of the optical fiber 100 (S2), for example, by drilling at positions set for inserting the optical fiber cores 110, that is, at positions at equal azimuth angle intervals around the center of the cross-section within the outer cladding.

Meanwhile, optical fiber cores 110, which are glass rods for optical fiber, may be prepared (S3).

Meanwhile, inner claddings 120 processed such that the corresponding respective optical fiber cores 110 can be inserted may be prepared (S4). Each inner cladding 120 may be manufactured by cutting open a specific portion of a silica glass tube containing fluorine and boron in the longitudinal direction. Accordingly, the inner claddings in the form of a tube cut such that the cross-section is C-shaped can be prepared. Further, the optical fiber core s110 may be inserted into the corresponding respective inner claddings 120 (S5).

Next, the inner claddings 120 into which each optical fiber core 110 is inserted are inserted into the insertion holes formed in the outer cladding 130 (S6). Then, the optical fiber drawing process is applied to the outer cladding 130 into which the inner claddings 120 are inserted (S7). In this process, the outer peripheral surfaces of the inner claddings and the inner surfaces of the insertion holes are brought in close contact with each other to fabricate a special optical fiber 100.

Meanwhile, before performing the drawing step (S7), C-shaped cut-open portion 123 of the inner cladding 120 may be filled with a material having the same refractive index as that of the optical fiber core 110 or a material having the same refractive index as that of the outer cladding 130. Of course, the process of filling the cut-open portion 123 may be omitted.

However, a part of the outer cladding 130 or a part of the optical fiber core 110 may melt through the drawing process, thus filling the cut-open portion 12. As a result, the cut-open portion 123 will be filled.

Here, if the drawing process is performed with the guide core formed inside the outer cladding or on the outer surface of the outer cladding, it is possible to easily check whether the optical fiber which has been manufactured through the drawing process is twisted by visually or by an optical device. Furthermore, when the optical fiber is coupled to a predetermined part of the optical circuit, the convenience of mounting can be ensured by the guide core.

Meanwhile, as another manufacturing method, by using a rod-in-tube method, the optical fiber core 110 prepared in step (S3) is coated with glass for inner cladding such that the cross-section of the inner cladding is C-shaped. Accordingly, the inner cladding 120 coated in a C-shape may also be formed surrounding the optical fiber core 110 (S4'). The subsequent steps (S6 and S7) are the same as described above.

Furthermore, in yet another manufacturing method, the material of the inner cladding may be coating on the entire outer surface of the optical fiber core 110 prepared in step S3 using a known chemical vapor deposition process (S4"). Then, a part of the coating is removed by cutting or etching, thereby forming a C-shaped cut-open portion 123 (S5"). The subsequent steps (S6 and S7) are the same as described above.

Figure 7:
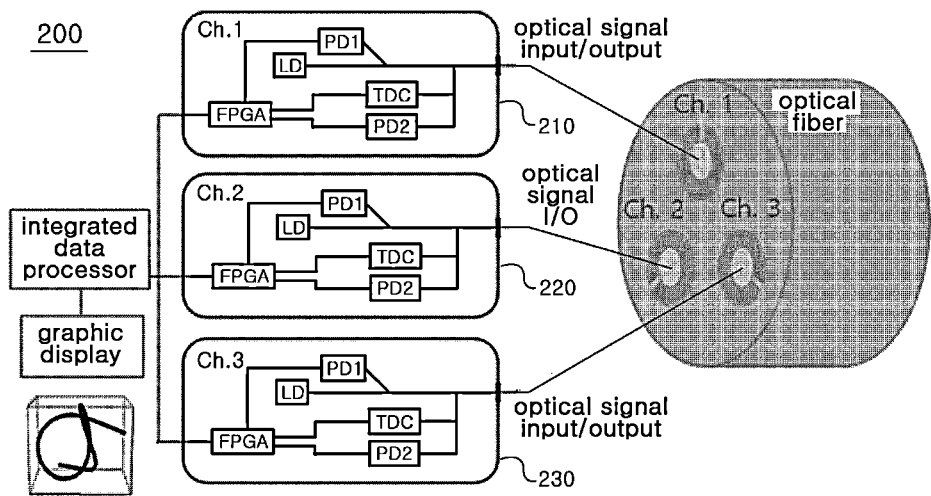
FIG. 7 illustrates a schematic configuration of a three-dimensional curved shape measuring system according to an embodiment of the present invention.
Figure 8:
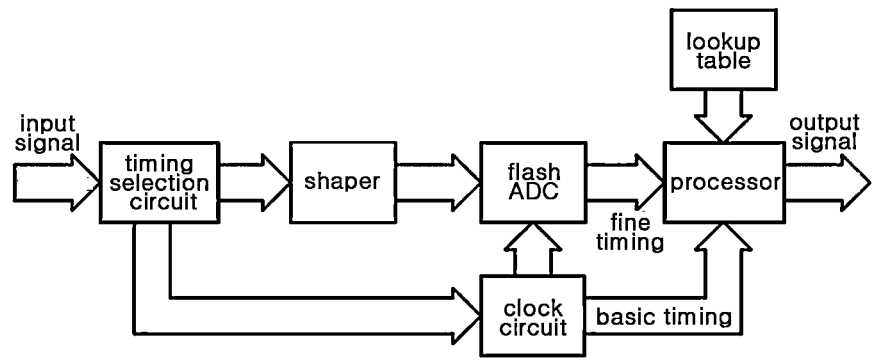
FIG. 8 illustrates the configuration and function of the TDC part in more detail in the 3D curved shape measuring system.
Figure 9:
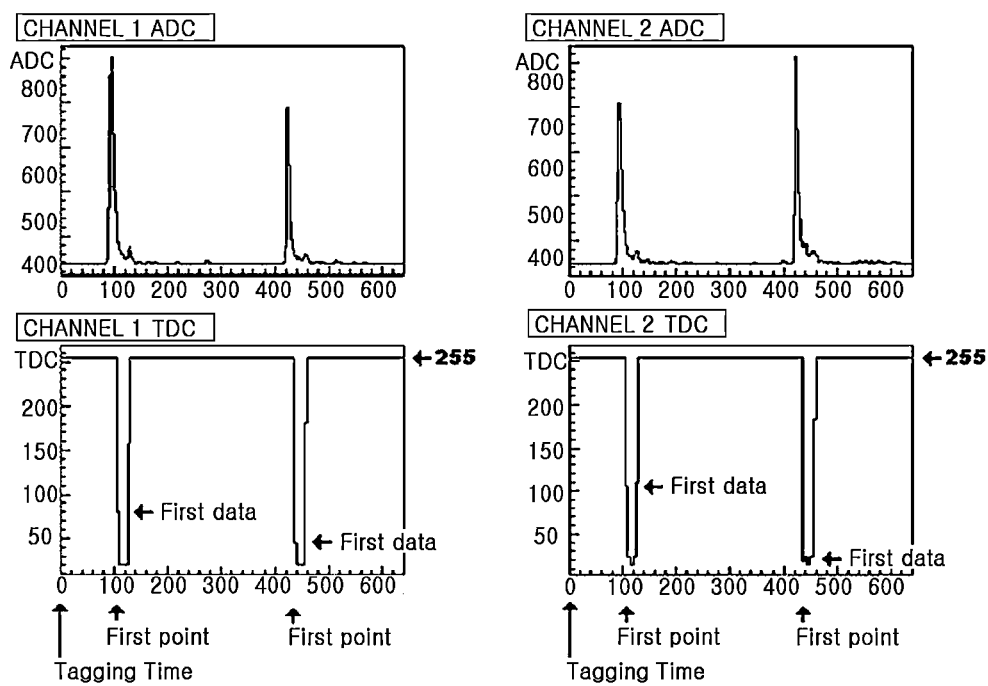
FIG. 9 illustrates an example of a peak measured by the TDC part.

A three-dimensional curved shape can be measured by using a special optical fiber having a plurality of core structures arranged at specific angles, and using the following system and method to be described. FIG. 7 illustrates schematically a configuration of a system for measuring a three-dimensional curved shape using a special optical fiber according to the present invention that is configured and manufactured as described above. FIG. 8 illustrates in more detail a configuration of a time to digital converter (TDC) part in the illustrated three-dimensional curved shape measuring system. FIG. 9 illustrates results of peaks detected by the TDC part.

The system 200 for measuring a three-dimensional curved shape using a special optical fiber according to the present invention comprises a plurality of channels, wherein each channel is constructed by combining one optical fiber core and one bending measurement device. Each of the bending measurement devices 210, 220, 230 calculates bending locations and curvatures at the bending locations by measuring optical losses along the longitudinal direction appearing in each optical fiber using optical time/frequency domain reflection (OTDR/OFDR) technology. The system 200 reproduces a three-dimensional shape by incorporating integrating the bending locations and the curvatures at the bending locations calculated by the bending measurement devices 210, 220, 230 for the respective channels.

Hereinafter, the configuration and operation of any one bending measurement device will be described.

A laser diode (LD) outputs an optical signal toward the input side of the optical fiber core of a corresponding channel. The optical signal is a light having a predetermined power, and may be pulsed light having peaks and widths of a specific size or continuous light.

A photo detector 1 (PD1) is configured to measure the power of the optical signal which is input to the optical fiber core. For example, in the case of pulsed light, the power of the corresponding pulses may be measured, and in the case of continuous light, the power for a specific time period may be measured.

A TDC part (Time to Digital Converter part) detects a Fresnel reflection peak from a reflected signal, detects the size or width of the peak, and analyzes the time at which the peak appears, wherein the reflected signal is an optical signal returned to the input side of the optical fiber core after the optical signal which is input to the optical fiber core from the LD is scattered/reflected backward at a specific bending location of the optical fiber core. Additionally, a signal sampled in a time domain can be averaged to reduce noise.

Meanwhile, the TDC part may have an Analog-Digital Converter (ADC) function to convert the collected optical signal into a digital signal. The optical signal may be a signal in the time domain, and may be converted into a physical quantity related to the respective distances by converting the optical signal into a digital signal and sampling the digital signal according to each of predetermined distances based on the OTDR.

A photo detector 2 (PD2) is configured to also receive the reflected signal and measure the power of the reflected signal.

The optical signal may be a high-power continuous light or a high-speed/high-power pulsed light. The optical signal from a light source that may be provided for each channel is input to the optical fiber core of each channel. The reflected signal is an optical signal that is reflected and returned after passing through a specific length of the optical fiber. The reflected signal is incident on the TDC part and the photo detector PD2 through a coupler (not shown), and when a peak is detected in the TDC part, a bending location may be calculated based on the time at which the peak is detected. In addition, as the power of the reflected signal is measured by the photo detector PD2, the optical loss at the location where the bending occurs may be calculated, and the curvature may be calculated based on the calculated optical loss. Since the reflected signal which is incident on the photo detector PD2 is reduced in the amplitude of the optical signal due to Raleigh reflection and backscattering in the optical fiber, and the like, the reflected signal received by the photo detector PD2 is converted into an electrical signal and then amplified with a predetermined gain value.

The photo detector PD2 changes a current according to a light intensity of the incident light. The amount of change in the current is amplified firstly by a Trans Impedance op-AMP (TIA), and is subjected to a signal process including short-wavelength amplification, long-wavelength high-amplification, long-wavelength low-amplification, and Fresnel reflection amplification.

A short-wavelength signal must be amplified separately from a long-wavelength signal because the pulse width of the short-wavelength signal is damaged when the amplification ratio is too high. In addition, a long-wavelength signal has a small amount of attenuation of the pulse width of the signal even if the amplification ratio is high, and thus high amplification is possible.

Meanwhile, when a connection or cut occurs at any location of the optical fiber, a Fresnel reflection appears. Because the amplitude of the reflected signal due to the Fresnel reflection is large, in this case the degree of amplification of the reflected signal should be reduced. The amplified analog signal amplified in this way is converted into a digital signal through the FPGA and then fed back to an integrated data processor.

The FPGA controls the operations of the LD, PD1, TDC part, and PD2, and can calculate the bending locations and the curvatures at the bending locations by identifying the locations of optical losses occurred in the optical fiber core.

The bending location may be calculated by selectively using or combining the OTDR method and the OFDR method, wherein the OTDR method is based on a difference between a peak output time of the optical signal and a peak detection time based on the reflected signal, and the OFDR method is based on a difference between an output frequency of the optical signal and a frequency sensed from the reflected signal.

The curvature of the bending location may be calculated by a difference between a peak output power of the optical signal and a peak input power based on the reflected signal.

According to this configuration, when a bending location and a curvature in any one channel are calculated, a three-dimensional bending location and a bending curvature may be calculated by incorporating bending locations and curvatures for each channel.

The three-dimensional curved shape measuring system according to the present invention may further include an integrated data processor configured to reproduce a three-dimensional curved shape by integrating bending locations and curvatures output from a plurality of bending measurement devices. In addition, the system may further include a graphic display for visually displaying the reproduced three-dimensional curved shape.

The integrated data processor combines the optical losses from respective channels. In particular, locations and curvatures are received from respective channels and final bending locations and curvatures are calculated in a way of obtaining arithmetic average or weighted average of the bending locations and curvatures, and the like.

When a reflected signal that is reflected and returned after a pulse-modulated optical signal is incident on the optical fiber core, is received by the photo detector PD2, the bending curvature of the corresponding location is calculated by measuring the power of the reflected signal. In addition, since the power (or frequency) is weakened according to the distance when a light pulse passes through the optical fiber, the bending location may also be calculated using the power detected by the photo detector PD2. The FPGA calculates this backscattered reflected signal received from the photo detector PD2 as a function of time to realize the optical loss according to the length of the optical fiber as an image. When measuring such a reflected signal, the reliability of the measurement can be improved by averaging measurement results measured several times in order to improve the time resolution.

Meanwhile, the reflected signal that is scattered backward and returned has so low power that noise may be added to the signal. Therefore, if the signal-to-noise ratio (SNR) of the measured data is high, it may be difficult to find out a location where optical loss occurs due to bending, and thus an averaging algorithm for compensating for this difficulty may be applied.

That is, based on the characteristic that the noise signal is irregularly appeared, the noise signal can be removed by accumulating and averaging the reflected signals measured by the photo detector PD2. According to this averaging algorithm, the optical loss occurring due to bending stands out, thereby facilitating bending state analysis along the longitudinal direction of the optical fiber.

By using the special optical fiber according to the present invention, the Z-axis coordinate along the longitudinal direction of the optical fiber for the bending location can be calculated, and the X-axis coordinate and Y-axis coordinate for the bending direction at the corresponding location can be calculated by combining the bending curvatures for each channel. The shape of the special optical fiber can be imaged as a three-dimensional curved shape using the calculated coordinates by means of a graphic display.

Figure 1:
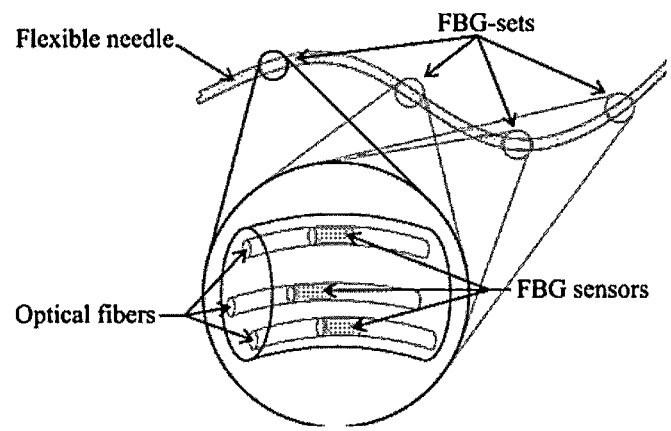
FIG. 1 illustrates a curved shape measurement method based on FBG according to the prior art.
Figure 1:
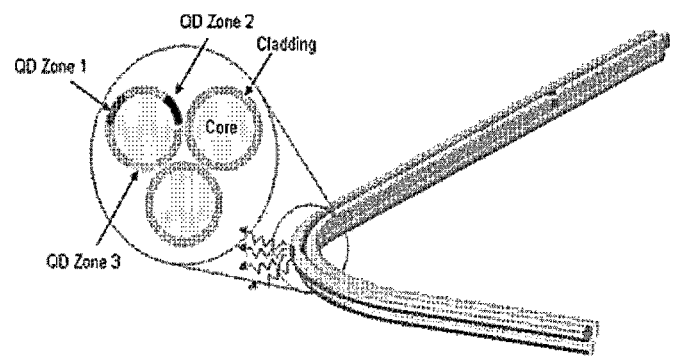
Figure 2:
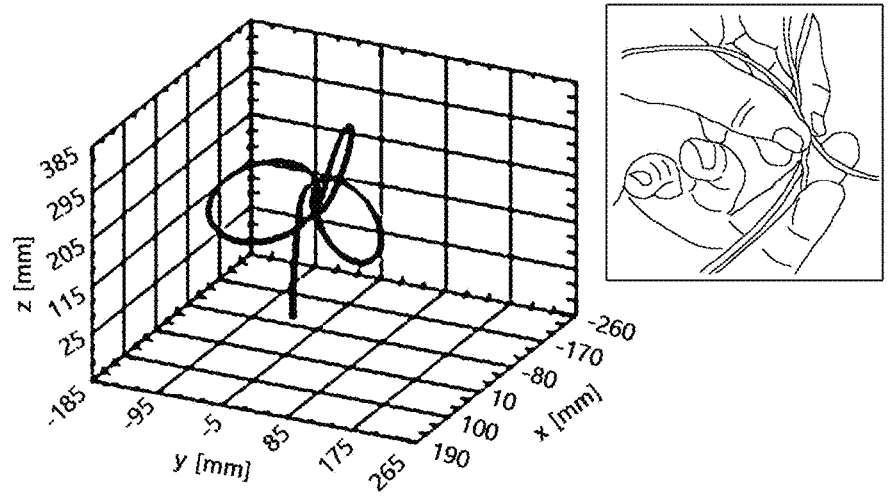
FIG. 2 illustrates an example of measuring a three-dimensional curved shape using a special optical fiber according to the present invention.

By means of the three-dimensional curved shape measuring system according to the present invention including such a configuration and performing such an operation, it is possible to accurately measure and visually image a three-dimensional curved shape of an arbitrarily curved optical fiber, as shown in FIG. 2.

FIG. 8 illustrates in more detail the configuration and function of the TDC part in the above-described three-dimensional curved shape measuring system. The TDC part of the present invention can operate, for example, with a resolution of 25 ps and a measurement time range of 1 ms or more.

When a timing selection circuit receives an input signal (ie, a reflection signal of an optical signal output from the LD), the timing selection circuit outputs a logic pulse corrected for a time walk according to the shape and size of the input signal to the clock circuit. The clock from the 100 MHz clock circuit is counted based on the signal output from the timing selection circuit, and the basic timing is measured.

Meanwhile, the input signal is input to a shaper and is shaped by being subdivided into a rising time of 1 ns or less.

A flash ADC can be synchronized with the clock circuit and share the clock. The flash ADC digitally converts the rising edge of the shaper output and tracks a time point when the shaped signal output from the shaper starts. Thus, by figuring out when the shaper's output signal starts between the 100 MHz clocks (ie, a basic timing) repeated every 10 ns (ie, a fine timing), it is possible to accurately figure out the input timing of the reflected signal in units of 10 ns.

In general, since an output signal waveform of the shaper is non-linear, the relationship between the value of the flash ADC and the pulse start time can be obtained using a lookup table.

A processor combines the basic timing and the fine timing with reference to the lookup table to determine the appeared time and width of the reflected signal.

The advantage of this method is that since the flash ADC is used to measure the fine timing, a digitizer dead time that can occur in a pulse stretching method does not occur, and that the operating range can be greatly expanded by increasing the number of bits of a basic time counter.

FIG. 9 illustrates an example of a peak measured by the TDC part. As shown in measurement results, by applying a mutual comparison process to synchronized measurement results of the ADC and the TDC part to remove measurement errors such as noise, precise measurement is possible even for signals with low SNR.

The accuracy of the TDC part depends on the shaping time of the shaper, the aperture jitter of the ADC, and the number of effective bits of the ADC.

Figure 10:
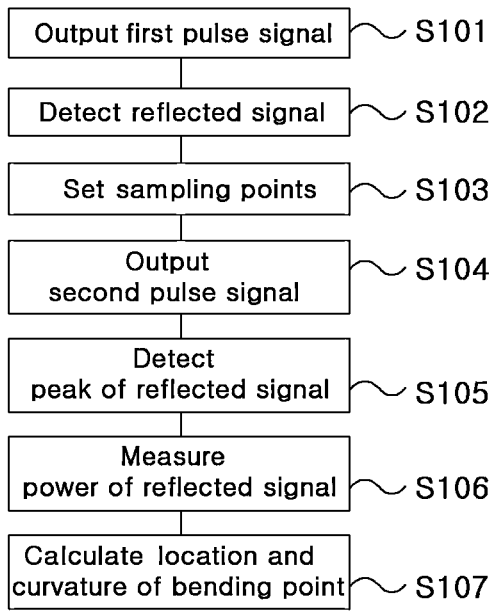
FIG. 10 is a flowchart of a method for measuring a bending location and a curvature in one channel in a three-dimensional curved shape measuring system.

Next, with reference to FIG. 10, a method for measuring the curved shape of any one channel by using a corresponding bending measurement device will be described. The respective operations can be controlled by the FPGA, but it will be described as the respective constituting units autonomously decide and perform the above operations.

First, a first pulse signal having a first width is output from a LD of a corresponding channel (S101).

A TDC part detects a reflected signal of the output first pulse signal (S102).

The TDC part converts the detected reflected signal into a digital signal, and then, based on the converted digital signal, measures a time point at which the reflected signal appears after the first pulse signal is output. In addition, the TDC part sets sampling points to include the time points before and after the measured time point (S103).

The LD outputs, at this time, a second pulse signal having a second width (S104).

The TDC part detects the peak of a reflected signal of the second pulse signal from the previously set sampling points (S105). Then, a PD2 measures the power of the reflected signal of the second pulse signal (S106).

A FPGA calculates a bending location of the optical fiber core based on the peak detected by the TDC part, and calculates the curvature of the bending location based on the power measured by the PD2 (S107).

Figure 11:
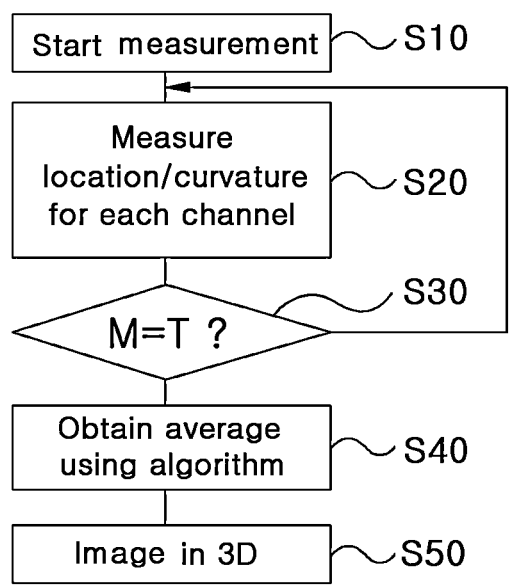
FIG. 11 is a flowchart of a three-dimensional curved shape measuring method performed by the three-dimensional curved shape measuring system according to the present invention.

Meanwhile, the three-dimensional shape of the optical fiber can be measured by combining information for the respective channels. A method of measuring a three-dimensional curved shape by the three-dimensional curved shape measuring system according to the present invention will be described with reference to FIG. 11.

First, in order to measure a three-dimensional curved shape of a specific object, the special optical fiber 100 according to the present invention is bent in close contact with the surface of the specific object or the arbitrary shape (S10).

Next, bending measurement devices 210, 220, 230 for the respective channels of the measuring system 200 input optical signals having predetermined characteristics (eg, number and magnitude of peaks, power, etc.) into the corresponding respective input sides of the optical fiber cores of the corresponding channels in the special optical fiber 100. Then, the peaks and powers of the reflected signals reflected in the optical fiber cores and output from the input sides are measured. Based on the timing/magnitude and power of the measured peaks of the reflected signals for the respective channels, the bending location and curvature in the corresponding channels are calculated (S20).

At this time, if the number (M) of the calculated bending locations and curvature measurement values reaches the predetermined target number (T) (S30), M measurement values are averaged. The averaged result values are determined as the measurement result value for the bending location and curvature in the corresponding channel (S40).

A measurement result values may be determined for each of the bending measurement devices 210, 220, and 230 for each channel. In addition, an image in a three-dimensional space is constructed by combining measurement results from all channels (S50).

Meanwhile, in step S40, the corresponding measurement values are stored whenever the peak and power of the reflected signal is measured, and when the number (M') of the measurement values reaches the target number (T'), the measurement values of the target number can be averaged. This averaged measurement values (ie, the average values of the peak and the average values of the power) can also be used to calculate the bending location and curvature of the corresponding channel.

In addition, when the special optical fiber according to the present invention is integrated with a distributed temperature sensor (DTS) which is based on the Raman and Brillouin scattering properties of the optical fiber, it is also possible to measure the temperature distribution along the longitudinal direction of the optical fiber.

Accordingly, using one optical fiber, not only the three-dimensional curved shape but also the temperature at each location of the curved shape can be measured.

The invention claimed is:

1. An optical fiber for measuring a three-dimensional curved shape, comprising an optical fiber core for transmitting an optical signal, an inner cladding covering the optical fiber core, and an outer cladding covering the inner cladding,
    wherein the optical fiber core has a refractive index n1, the inner cladding has a refractive index n2, and the outer cladding has a refractive index n3,
    the refractive index n1, the refractive index n2, and the refractive index n3 are set in a relationship of n1≥n3>n2,
    the inner cladding has a longitudinal cut-open portion which exposes a portion of the optical fiber core through the longitudinal cut-open portion, and
    the longitudinal cut-open portion is filled with a material having the same refractive index as that of the optical fiber core or the outer cladding, and
    wherein the inner cladding includes: a plurality of inner claddings covering the optical fiber core and disposed inside the outer cladding, each of the plurality of inner claddings having a cut-open portion,
    the plurality of inner claddings are disposed radially at intervals of an equal azimuth angle around a center of a cross-section of the outer cladding, and
    the cut-open portions of the plurality of inner claddings are disposed to face away from the center.

2. The optical fiber according to claim 1, further comprising a guide core disposed inside the outer cladding in parallel with the optical fiber core,
    wherein the guide core has a color or a refractive index different from that of the outer cladding.

3. The optical fiber for measuring the three-dimensional curved shape according to claim 1, wherein a thickness of the inner cladding is set to twice a diameter of the optical fiber core.

4. A method of manufacturing an optical fiber for measuring a three-dimensional curved shape, wherein the optical fiber comprises an optical fiber core transmitting an optical signal, an inner cladding covering the optical fiber core, and an outer cladding covering the inner cladding, the method comprising:
    preparing the outer cladding;
    forming an insertion hole in the outer cladding into which the inner cladding is to be inserted;
    preparing the optical fiber core;
    preparing the inner cladding in the form of a tube having an inner space into which the optical fiber core is to be inserted, wherein the inner cladding has a cut-open portion formed in a longitudinal direction of the inner cladding;
    inserting the optical fiber core into the inner space of the inner cladding;
    filling the cut-open portion of the inner cladding with a material having the same refractive index as that of the optical fiber core or the outer cladding; and
    inserting the inner cladding into which the optical fiber core has been inserted into the insertion hole of the outer cladding.

5. The method according to claim 4, wherein
the insertion holes formed in the outer cladding are radially arranged at equal azimuth angle intervals around a center of a cross-section of the outer cladding, and are formed parallel to each other along the longitudinal direction of the outer cladding, and
the inner cladding includes: a plurality of inner claddings arranged such that the cut-open portions are opened towards an outer peripheral side of the cross-section of the outer cladding.

6. A method of manufacturing an optical fiber for measuring a three-dimensional curved shape, wherein the optical fiber comprises an optical fiber core transmitting an optical signal, an inner cladding covering the optical fiber core, and an outer cladding covering the inner cladding, and wherein the optical fiber core has a refractive index n1, the inner cladding has a refractive index n2, and the outer cladding has a refractive index n3, and wherein the refractive index n1, the refractive index n2, and the refractive index n3 are set in a relationship of n1≥n3>n2, the method comprising:
preparing the outer cladding;
forming an insertion hole in the outer cladding into which the inner cladding is to be inserted;
preparing the optical fiber core;
coating the optical fiber core in a C-shape using a rod-in-tube process of partially coating the optical fiber core with a material for constituting the inner cladding;
filling a cut-open portion in the C-shape of the inner cladding with a material having the same refractive index as that of the optical fiber core or the outer cladding; and
inserting the optical fiber core coated with the inner cladding into the insertion hole of the outer cladding.

7. The method of manufacturing an optical fiber for measuring a three-dimensional curved shape according to claim 6, wherein
the insertion holes formed in the outer cladding are radially arranged at equal azimuth angle intervals around a center of a cross-section of the outer cladding, and are formed parallel to each other along the longitudinal direction of the outer cladding, and
the inner cladding includes: a plurality of inner claddings arranged such that the cut-open portions are opened towards an outer peripheral side of the cross-section of the outer cladding.

8. A method of manufacturing an optical fiber for measuring a three-dimensional curved shape, wherein the optical fiber comprises an optical fiber core transmitting an optical signal, an inner cladding covering the optical fiber core, and an outer cladding covering the inner cladding, and wherein the optical fiber core has a refractive index n1, the inner cladding has a refractive index n2, and the outer cladding has a refractive index n3, and wherein the refractive index n1, the refractive index n2, and the refractive index n3 are set in a relationship of n1≥n3>n2, the method comprising:
preparing the outer cladding;
forming an insertion hole in the outer cladding into which the inner cladding is to be inserted;
preparing the optical fiber core;
coating the entire outer surface of the optical fiber core with a material for constituting the inner cladding;
exposing a portion of the optical fiber core by cutting or etching a portion of the inner cladding along a longitudinal direction of the optical fiber core; and
inserting the optical fiber core covered with the inner cladding into the insertion hole of the outer cladding.

9. The method of manufacturing an optical fiber for measuring a three-dimensional curved shape according to claim 8, wherein
the insertion holes formed in the outer cladding are radially arranged at equal azimuth angle intervals around a center of a cross-section of the outer cladding, and are formed parallel to each other along the longitudinal direction of the outer cladding, and
the inner cladding includes: a plurality of inner claddings arranged such that the cut-open portions are opened towards an outer peripheral side of the cross-section of the outer cladding.

10. A system for measuring a three-dimensional curved shape using an optical fiber, the system comprising:
a LD for outputting an optical signal having a predetermined peak and a predetermined width to an input side of the optical fiber core;
a PD1 for measuring a power of the optical signal output from the LD and input to the optical fiber core;
a TDC part for detecting a peak of a reflected signal formed by the optical signal being scattered at a bending location of the optical fiber core and being returned to the input side of the optical fiber core;
a PD2 for measuring a power of the reflected signal; and
an FPGA for controlling operations of the LD, the PD1, the TDC part, and the PD2, and calculating the bending location of the optical fiber core and a curvature of the bending location, based on the peak of the optical signal output from the LD, the power of the optical signal measured by the PD1, the peak of the reflected signal detected from the TDC part, and the power of the reflected signal measured by the PD2.

11. The system according to claim 10, wherein the optical fiber core further comprises:
an inner cladding covering the optical fiber core, and
an outer cladding covering the inner cladding; and
wherein the optical fiber core has a refractive index n1, the inner cladding has a refractive index n2, and the outer cladding has a refractive index n3, and wherein the refractive index n1, the refractive index n2, and the refractive index n3 are set in a relationship of n1≥n3>n2,
the inner cladding covering the optical fiber core has a cut-open portion that is cut in the longitudinal direction to expose a portion of the optical fiber core, and the cut-open portion is filled with a material having the same refractive index as that of the optical fiber core or the outer cladding.

12. The system according to claim 10, wherein
the inner cladding includes a plurality of the inner claddings covering the optical fiber core and disposed inside the outer cladding and each of the inner claddings configures a channel,
the inner claddings are disposed radially at equal azimuth angle intervals around a center of a cross-section of the outer cladding;
the respective inner claddings are arranged such that the cut-open portions face away from the center of the outer cladding;
the LD, the PD1, the TDC part, the PD2 and the FPGA constitute one bending measurement device,
the respective bending measurement devices are arranged to correspond to each of the optical fiber cores, and
the system further comprising an integrated data processor for reproducing the three-dimensional curved shape by integrating bending locations and curvatures of the bending locations output from the bending measurement devices for the respective channels.

13. The system according to claim 10, wherein the FPGA is configured to:
output a first pulse signal having a first width from the LD;
detect a reflected signal of the first pulse signal by the TDC part,
set a sampling point including a time point at which the reflected signal appears after the first pulse signal is output, based on the reflected signal;
output a second pulse signal having a second width from the LD;
detect a peak of a reflected signal of the second pulse signal by the TDC part at the sampling point and measuring a power of the reflected signal of the second pulse signal by the PD2; and
calculate a bending location of the optical fiber core based on the detected peak, and calculate a curvature of the bending location based on the measured power.

14. The system according to claim 13, wherein the first width is smaller than the second width.

\* \* \* \* \*